United States Patent [19]
Haeussler et al.

[11] Patent Number: 5,483,639
[45] Date of Patent: Jan. 9, 1996

[54] DEVICE FOR DETECTING TRANSMISSION ERRORS IN BALANCED TWO-WIRE BUS LINES AND TWO-BUS INTERFACES

[75] Inventors: Bernd Haeussler, Ostfildern; Max Reeb, Uhingen; Karl-Heinz Mueller, Friedrichshafen, all of Germany

[73] Assignee: Mercedes-Benz AG, Germany

[21] Appl. No.: 212,885

[22] Filed: Mar. 14, 1994

[30] Foreign Application Priority Data

Mar. 12, 1993 [DE] Germany .................. 43 07 794.3

[51] Int. Cl.$^6$ .................. H04L 29/14; H04L 12/26
[52] U.S. Cl. .................. 395/183.19; 395/185.09
[58] Field of Search .................. 371/8.2, 57.2, 371/29.5, 62, 68.1; 340/825.03; 395/575, 183.19, 185.09, 185.01

[56] References Cited

U.S. PATENT DOCUMENTS 5,267,251 11/1993 Lenoir et al. .

FOREIGN PATENT DOCUMENTS

0489990 6/1992 European Pat. Off. .

*Primary Examiner*—Robert W. Beausoliel, Jr.
*Assistant Examiner*—Alan M. Fisch
*Attorney, Agent, or Firm*—Evenson, McKeown, Edwards & Lenahan

[57] ABSTRACT

A device for monitoring balanced two-wire bus lines and two-wire but interfaces has first, second and third comparison circuits for comparing the wire potentials with one another and with a fixed reference voltage, and two shift registers or counters as well as at least one pulse generator for deriving reset pulses from each change in sign of the potential comparison of the two bus conductors with one another. The shift registers or counters are respectively reset by the reset pulses. Result signals produced from the comparison of the bus potentials with a fixed reference voltage can be fed to the shift registers or counters for the purpose of shifting or incrementing said registers or counters respectively. The register length or number of counter stages can be selected as a function of a desired bit error tolerance depth. The device can be extended by a self-resetting system after temporary bus disturbances. The device is also programmable, and thereby universal, and because of an integration capability using standard technology and having a very low space requirement is suitable as a compilable standard cell for possible bus chip designs. The device is operable in cooperation with software routines of a decentral bus test system as a test receiver for analyzing bus disturbances.

12 Claims, 4 Drawing Sheets

DEVICE FOR DETECTING TRANSMISSION ERRORS IN BALANCED TWO-WIRE BUS LINES AND TWO-BUS INTERFACES

BACKGROUND AND SUMMARY OF THE INVENTION

The present invention relates to a device for monitoring balanced two-wire bus lines and two-wire bus interfaces for serial data transmission, the bus lines and the bus interfaces having first and second line conductors that change their polarity in antiphase in the normal state.

Balanced two-wire bus lines and balanced interfaces or bus drivers are widely used to transmit digital information on serial paths. In this case, the binary data are transmitted via, for example, line conductors twisted with one another; the conductors are driven in antiphase in this case. Various measures are known for testing the defect-free availability of such lines and of the line drivers driving them as well as of the line receivers connected thereto. For example, test bits are inserted into messages to be transmitted, and the operability of the bus line and of the transmitting interface is checked by devices connected to the bus by verifying the proper reception of the test bits. Another approach is to send test telegrams via the bus line at a predetermined time interval. Devices connected to the bus then check whether the test messages are received within the system-specific fixed time interval, with the result that, when they are lacking, it can be concluded that there is a defect in the bus system. Another approach is to use monitoring electronics to monitor the potential difference between the conductors of such a bus line or the potentials on the line conductors and to test the extent to which corresponding voltage values lie outside the state change times inside a defined tolerance window.

A disadvantage in all these known solutions is the relatively high outlay on hardware and software.

It is therefore an object of the invention to provide a device for monitoring balanced two-wire bus lines and two-wire bus interfaces which manages with a low outlay, functions independently of potential differences such as, for example, a ground offset between individual bus stations, and can be realized using standard technology and is integratable on a semiconductor chip.

This and other objects are achieved by the present invention which provides a device for monitoring balanced two-wire bus lines and two-wire bus interfaces for serial data transmission, the bus lines and the bus interfaces having first and second line conductors that change their polarity in antiphase in the normal state. The device comprises first, second and third comparison means, the first comparison means having a positive input operationally connected to the first bus conductor and a negative input connected to a reference potential. The second comparison means has a negative input connected to the second bus conductor and a positive input connected to the reference potential. The third comparison means has an input side connected to the first and second bus conductors. A first shift register or counter having a clock input is operationally connected to an output of the first comparison means. A second shift register or counter having a clock input is operationally connected to an output of the second comparison means. Means for conditioning signal edges to form pulses are provided. The means for conditioning are connected downstream of the third comparison means and have an output connected to reset inputs of the shift registers or counters. The shift registers or counters each have at least one output. A first error status signal relating to the first bus conductor is at a first one of the outputs, and a second error status signal relating to the second bus conductor is at a second one of the outputs.

The device according to the invention comprises first, second and third comparison means for comparing the wire potentials with one another and with a fixed reference voltage, and two shift registers or counters as well as at least one pulse generator for deriving reset pulses from the changes of sign from the intercomparison of the potentials of the two bus conductors. The shift registers or counters are reset at the same time by the reset pulses. In order to shift or increment the shift registers or counters respectively, they can be fed the result signals produced by the comparison of the bus potentials with a fixed reference voltage. The register length or number of counter stages in this case determines the depth of bit error tolerance of the device. The logic state of the respectively last-reached state of appropriately selected outputs of the shift registers or counters characterizes in this case the most recent, still detectable error state of the bus conductor which clocks the respective other shift register or counter.

Thus, in accordance with certain preferred embodiments, the pulse generator can be implemented from a few logic gates. Static error signals, that is to say error signals which, after occurring, are not volatile in conjunction with the disappearance of bus errors, are delivered by a device developed in accordance with other embodiments certain embodiments perform automatic resetting after a temporary disturbance of even only one conductor. Certain developments of the invention benefit the integrability of the device and certain developments allow the forming of a programmable device, which to that extent is particularly universal and suitable for large-scale integration. The device can be designed as a standard cell. The device can be operated as a test receiver for analyzing bus disturbance in cooperation with software routines of a decentral bus test system.

Other objects, advantages and novel features of the present invention will become apparent from the following detailed description of the invention when considered in conjunction with the accompanying drawings.

DETAILED DESCRIPTION OF THE DRAWINGS

Figure 1:
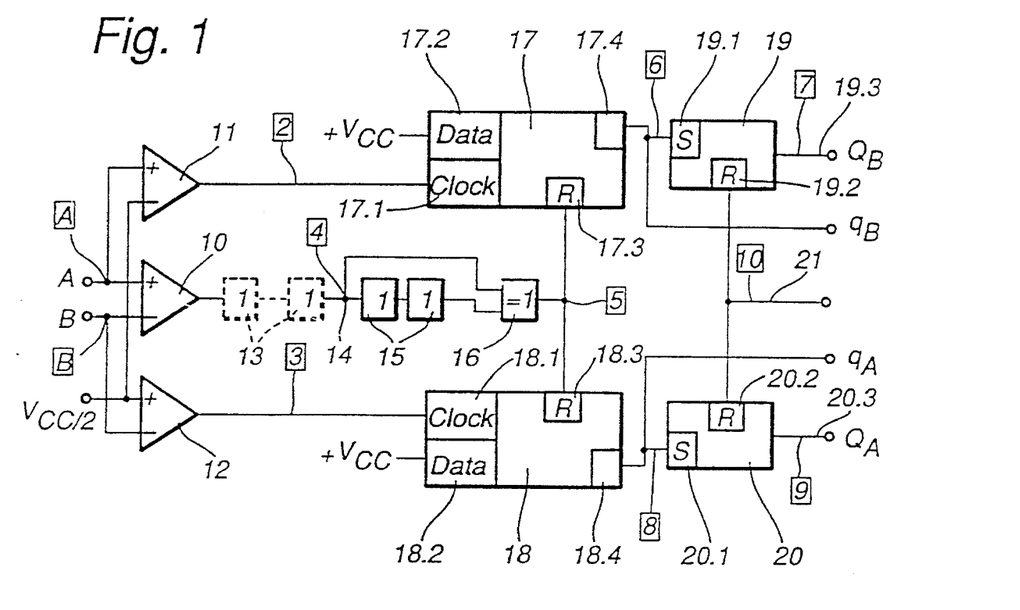
FIG. 1 shows a functional circuit diagram of a first exemplary embodiment of the device of the present invention.

In accordance with FIG. 1, a first exemplary embodiment of the device comprises on the bus side three comparators 10, 11 and 12. The bus conductor A is connected to the positive inputs of the comparators 10 and 11 and the bus conductor B is connected to the negative inputs of the comparators 10 and 12. The negative input of comparator 11 and the positive input of the comparator 12 are connected to a reference DC voltage ($V_{cc}/2$) which is between the two permitted signal state potentials of the bus, in certain preferred embodiments, centrally therebetween.

The comparator 10 on which the two bus conductors A, B act is connected on the output side to a pulse generator which generates reset pulses. The pulse generator comprises here, for example, only one EXCLUSIVE-OR circuit 16 and time-delay means 15. For this purpose, the output of the comparator 10 is operationally connected to the first input of the EXCLUSIVE-OR circuit 16. This comparator output is also connected to the second input of the circuit 16 via the time-delay circuit, in this case, for example, via at least one logic gate structure or switching amplifier structure (buffer) 15. A series circuit of a plurality of gate structures or amplifier structures 15 can be used, depending on the production technology.

The output of the EXCLUSIVE-OR circuit 16 is provided to the reset inputs 17.3 and 18.3 of two counters or shift registers 17 and 18. The clock input 17.1 of the counter or shift register 17 is fed from the output of the comparator 11. The clock input 18.1 of the counter or shift register 18 is fed from the output of the comparator 12. If shift registers 17 and 18 are used instead of counters, the serial data inputs 17.2 and 18.2 thereof are connected to a fixed logic potential, in this case, for example, to $+V_{cc}$ ("high"), with the result that this logic state is read in and shifted on in the shift register with each rising clock edge. When counters are used, the DATA inputs 17.2 and 18.2 are omitted.

Depending on the design of the shift registers or counters 17 and 18, certain embodiments have still further signal-delaying elements 13, for, example at least one logic gate structure or switching amplifier structure (buffer) 13, in the signal path between the comparator 10 and the reset inputs 17.3 and 18.3. These further signal-delaying elements are superfluous in the case of shift registers or counters with dominant RESET function.

The outputs 17.4 and 18.4 of the counters or shift registers 17 and 18, respectively, represent the dynamic error status outputs of the device. The output 17.4 of the shift register or counter 17 clocked by the bus conductor A is the dynamic error status output $q_B$ for errors on the bus conductor B, and the output 18.4 of the shift register or counter 18 clocked by the bus conductor B is the dynamic error status output $q_A$ for errors on the bus conductor A.

For the case in which error status signals are intended to be stored and not to be cleared except by an external command, that is to say error status signals are intended to be available as long as desired for evaluation, the outputs 17.4 and 18.4 of the counters or shift registers 17 and 18, respectively, are provided to set inputs 19.1 and 20.1, respectively, of two flipflops 19 and 20. Their reset inputs 19.2 and 20.2 are connected to a reset line 21 which is to be actuated from an external signal.

The outputs 19.3 and 20.3, respectively, of the flipflops 19 and 20 represent the static error status outputs of the device. The output 19.3 of the flipflop 19, which is connected downstream of the counter or shift register 17 clocked by the bus conductor A, is the static error status output $Q_B$ for errors on the bus conductor B, and the output 20.3 of the flipflop 20, which is connected downstream of the counter or shift register 18 clocked by the bus conductor B, is the static error status output $Q_A$ for errors on the bus conductor A.

Figure 2A:
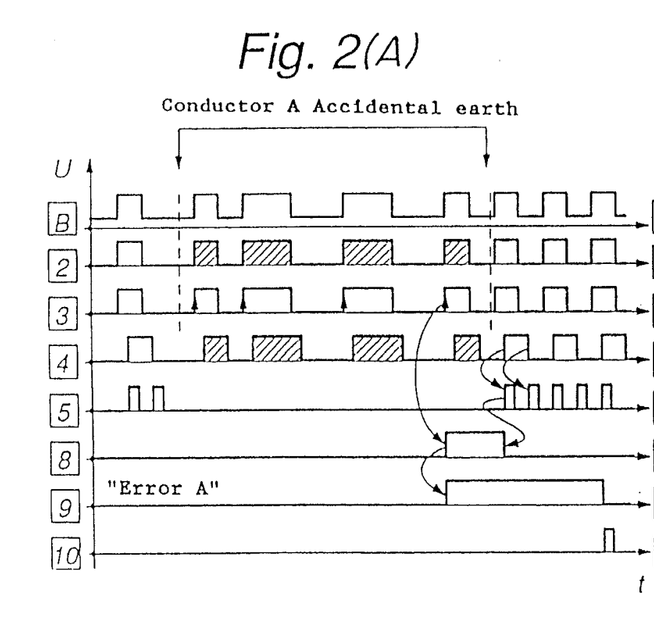
FIG. 2 shows typical characteristics of the bus conductor potential and signals derived therefrom for the embodiment of FIG. 1, and with the effects of various bus defects being illustrated.
Figure 2B:
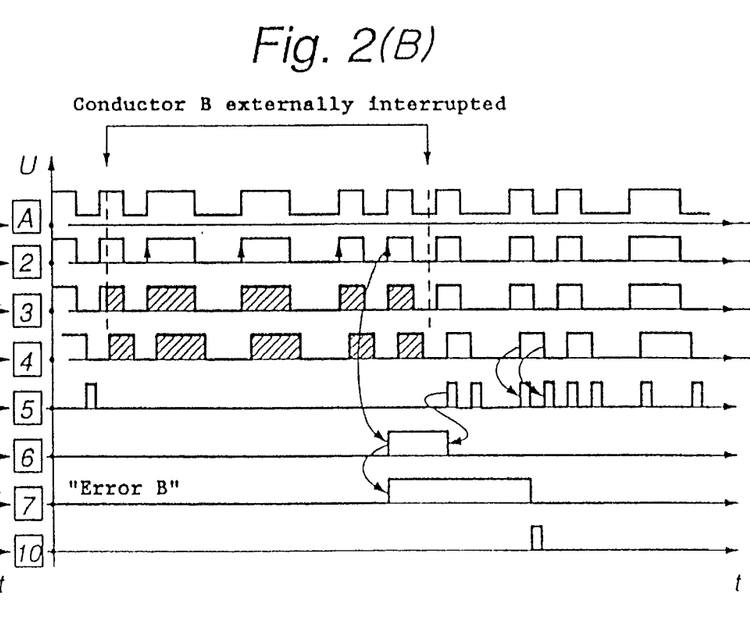

The functioning of the device previously described is illustrated with the aid of FIG. 2. In this case, the signals assigned to boxed symbols in FIG. 2 are present at those nodes of the functional circuit in accordance with FIG. 1 which are characterized by correspondingly boxed symbols. In this example, FIG. 2 is based additionally on time-delaying circuits 13 and not necessarily on RESET-dominant shift registers or counters. To this extent, for monitoring purposes, corresponding gates 13 are assigned a first transit time, and gates 15 a second transit time. Without loss of generality, the delay in the edges of the signal [4] with respect to corresponding edges of the signals [2] and [3] which is represented in FIG. 2 can thus also in practice be vanishingly small or be omitted.

The comparator 10 compares the antiphase edge change in the potentials of the conductors A and B with one another. The comparator 11 detects those time intervals in which the potential on the bus conductor A is above the reference potential $V_{cc}/2$. The comparator 12 detects those time intervals in which the potential on the bus conductor B is below the reference potential $V_{cc}/2$. Corresponding logic output signals are output by the comparators 10, 11 and 12.

If the bus conductors A, B are driven symmetrically and the reference potential $V_{cc}/2$ corresponds with the mean voltage of the conductor potentials, equal signal voltages are present at the outputs of all three comparators. This means that the shift registers or counters 17 and 18, respectively, are clocked to shift or count by each pulse of the (identical) signal voltages [2] and [3]. The output signal of the comparator 10 is present at the tie point 14 and at an input of the EXCLUSIVE-OR circuit 16 delayed by the characteristic first transit time of the gate or gates 13, cf. [4]. This first transit time depends, possibly, on the number of series-connected gates 13, on the technology thereof and on the operating voltage, and to that extent is thus an invariant of the chip design. The same signal is present at the second input of the EXCLUSIVE-OR circuit 16 as at the first input thereof, but delayed by a characteristic second transit time. This second transit time depends, possibly, on the number of series-connected gates 15, on the technology thereof and on the operating voltage, and to that extent is thus also an invariant of the chip design. It is shorter than the shortest bit duration occurring in practice on the bus.

Both the leading and the falling edge of [4] are pulse-weighted by the gate or gates 15 and the EXCLUSIVE-0R function 16—using the second transit time as pulse duration—that is to say are marked by a unit pulse. Consequently, short reset pulses, in other words, a signal characteristic in accordance with [5], are present at the reset inputs 17.3 and 18.3 of the shift registers and counters 17 and 18, respectively, after both the leading and the falling edges of the clock pulses.

This means that, when the bus is operating properly in antiphase, the shift registers and counters 17 and 18, respectively, never go beyond the shift or counter state of 1, because after respectively being set to this state they are already reset again after the first transit time, cf. signals [2] or [3] and [5]. Since the outputs 17.4 and 18.4 assigned to a shift or counter state greater than 1 leave the logic state of "low", or are reset thereto each time, only if this resetting failed to take place previously due to disturbance, these outputs can be used to this extent as dynamic error status output $q_A$ and $q_B$.

As long as no error status outputs $q_A$ and $q_B$ leave the logic state of "low", neither of the two flipflops 19 and 20 is set. The outputs $Q_A$ and $Q_B$ thus remain in the logic normal state signalling freedom from bus error. This can also be brought about by an external reset pulse at input 21.

The left-hand part of FIG. 2 is based on the case of an "accidental earth" on the conductor A, and the right-hand part of FIG. 2 is based on the case of an "external interruption" of the conductor B. Such an external interruption of the conductor B causes a defined voltage level at the terminal B. It is produced as a consequence of the loss of the bus load with respect to the conductor B by the termination network 46 or 45, 49, 50A/B and 46, illustrated by way of example in FIG. 6, on a bus chip on which the device 46 is provided. From the two conductor terminals A and B the device taps the conductor signals [A] and [B]. Without such a termination network, the relevant terminal B would carry an undefined signal [B] in the event of an external interruption of the conductor B.

It is assumed by way of example that the shift or counter state "4", that is to say, for example the occurrence of logic "high" in the third last binary bit (0000 0100), is detected and a corresponding logic signal transfer at one of the outputs 17.4 and 18.4 then sets one of the flipflops 19 and 20. In practice, the evaluated shift or counter state can be or is matched to the normal bit length of a message; it could, for example, be "32" or "64" (0010 0000or 0100 0000) for messages which are 128 bits long, depending on the specific requirements.

While the earth short on the conductor A lasts, the hatched pulses in the signal [2] fail. The hatched pulses (delayed by the transit time of the gate/s 13) in the signal [4] likewise fail for just as long, as a result of which the reset pulse generation is also suppressed in accordance with the signal [5]. Consequently, during the failure of reset pulses, the fourth clock pulse edge sets the output 18.4 of the shift register or counter 18, that is to say the dynamic error status output $q_A$, to logic "high", cf. signal [8]. However, this signal edge also sets the flipflop 20, that is to say the static error status output $Q_A$ to "high", cf. signal [9].

After the disappearance of the earth short, reset pulses are formed again. The first of these reset pulses resets the shift register/s or counter/s 18, with the result that the output 18.4 thereof, that is to say the dynamic error status output $q_A$, again assumes logic "low", cf. signal [8]. In relation to the static display "error A", the flipflop 20 holds its output state "high" until it is reset by an external reset command at the input 21—for example from chip logic or a bus management program—cf. signals [9] and [10].

While the external interruption of the conductor B or the logically undefined state of signal [B] lasts, the hatched pulses in signal [3] fail. The hatched pulses (delayed by the transit time of the gate/s 13) in the signal [4] likewise fail for just as long, as a result of which the reset pulse generation is also suppressed in accordance with the signal [5]. Consequently, during the failure of reset pulses, the fourth clock pulse edge sets the output 17.4 of the shift register or counter 17, that is to say the dynamic error status output $q_B$, to logic "high". However, this signal edge also sets the flipflop 19, that is to say the static error status output $Q_B$ to "high", cf. signal [6].

After the disappearance of the conductor interruption, reset pulses are formed again. The first of these reset pulses resets the shift register/s or counter/s 18, with the result that the output 18.4 thereof, that is to say the dynamic error status output $q_A$, again assumes logic "low", cf. signal [6]. In relation to the static display "error A", the flipflop 19 holds its output state "high" until it is reset by an external reset command at the input 21—for example from chip logic or a bus management program—cf. signals [7] and [10].

It may be seen that by the choice of the length of the shift register or of the ordinal number of the shift cell after which the dynamic error status signal [6] or [8] is tapped, or by the choice of the counter state to be evaluated, or the choice of the bit number of the counter employed, it is possible to influence the response rate or "insensitivity" of the error status outputs $Q_A$ and $Q_B$ directly with respect to bit errors.

It is, however, possible for a quite specific tolerance, for example, to be desired in order to avoid a logic wind up of a corresponding bus network during its run up, that is to say during its initialization, or in order to exclude tolerable short-term bus disturbances from the error display.

Figure 3:
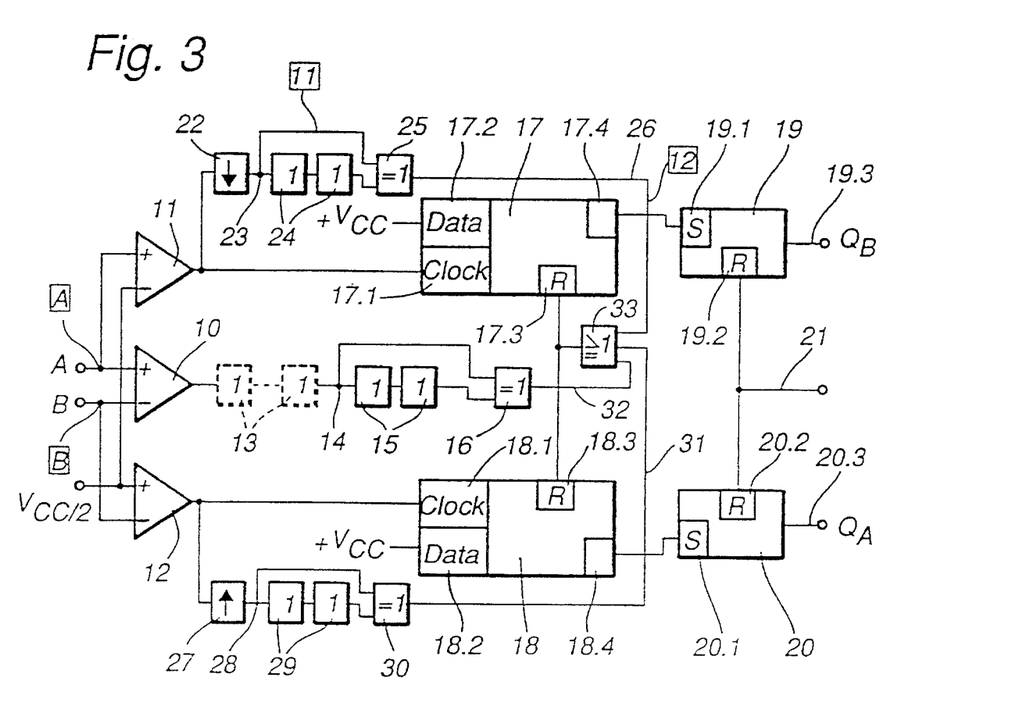
FIG. 3 shows a functional circuit diagram of the second exemplary embodiment of the device according to the present invention.

In cases of applications in which, for example, an automatic "awakening" of the bus network (that is to say, an automatic renewed run up or renewed initialization of all bus stations) is desired after a bus conductor defect, or else the repetition of such a (renewed) awakening by specific malfunctions is intended to be prevented, a device such as an embodiment of the invention illustrated in FIG. 3 is suitable. This differs from the first exemplary embodiment in accordance with FIG. 1 as described in the following.

The output of the comparator 11 which drives the clock input 17.1 of the counter or shift register 17 additionally further drives a single-edge-triggered timeout pulse generator which generates an additional reset pulse only after expiry of a prescribed, retriggerable time $T_f$. The timeout pulse generator comprises, for example, a monostable, edge-retriggerable timer 22, for example a monostable multivibrator, which is triggered in this embodiment by the falling drive edge. Its output 23 is provided directly to a first input and also, via, for example, at least one logic gate or one switching amplifier stage (buffer) 24 with a defined transit time delay, to the second input of a further EXCLUSIVE-OR circuit 25.

In a corresponding way, the output of the comparator 12 which drives the clock input 18.1 of the counter or shift register 18 drives a further monostable, edge-retriggerable timer 27 which is triggered here, for example, by the leading drive edge. Its output 28 is led directly to a first input and also via, for example, at least one logic gate or one switching amplifier stage (buffer) 29 with a defined transmit time delay, to the second input of a further EXCLUSIVE-OR circuit 30.

The output 32 of the EXCLUSIVE-OR circuit 16 is not provided directly to the reset inputs 17.3 and 18.3 of the counters and shift registers 17 and 18, respectively, but to one of the three inputs of an additional OR circuit 33 which feeds the reset inputs 17.3 and 18.3 on the output side. The outputs 26 and 31 of the EXCLUSIVE-OR circuits 25 and 30 are led to the two other inputs of the OR circuit 33.

The remaining structure corresponds to that in accordance with FIG. 1. In this case, the additional delaying element 13, which are represented hatched, can be dispensed with here from the point of view that the additional OR circuit 33 already produces a basic delay in the reset pulse, which can be sufficiently large to operate even non-RESET-dominant shift registers or counters.

Figure 4:
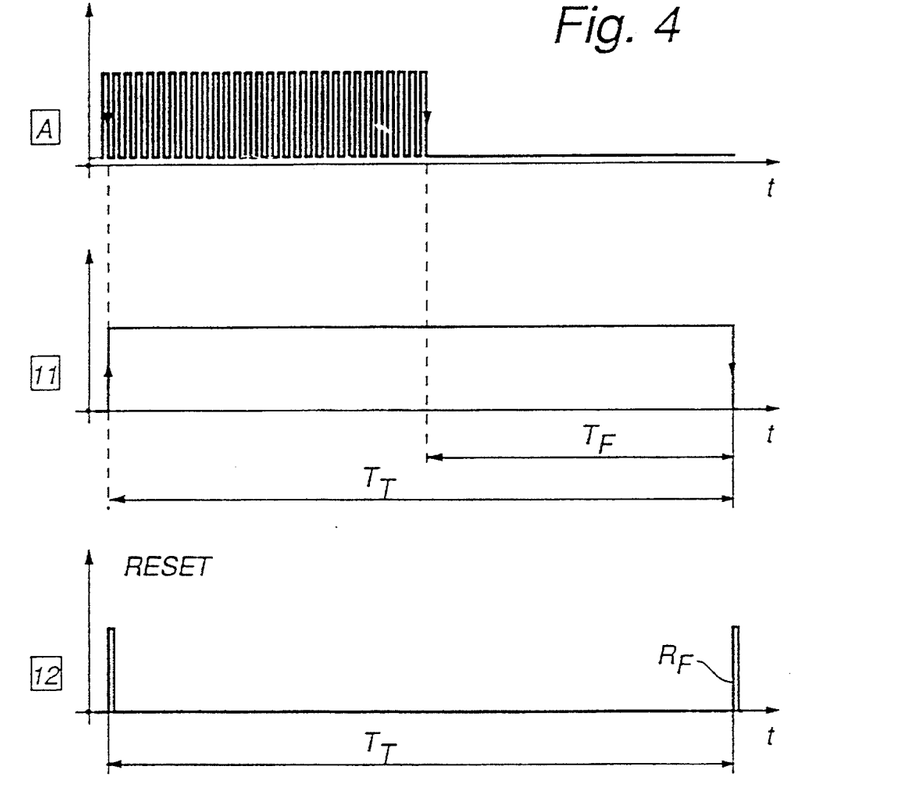
FIG. 4 shows a diagram of the generation of an additional reset signal after the decay of a temporary bus disturbance.

The function of this exemplary embodiment is illustrated below with the aid of FIG. 4; in this case, the signals assigned to the boxed symbols are present at the nodes of the functional circuit in accordance with FIG. 3 characterized by correspondingly boxed symbols.

The signal [A] represents a disturbing pulse burst on the bus conductor A such as can be produced, for example, as a temporary disturbance due to capacitive crosstalk from other signal-conducting lines (thus, for example, from supply lines of a load which is clocked at a fast rate) or as a consequence of electromagnetic irradiation onto the bus (thus, for example, by contact bouncing in the course of a supply current path extending near the bus, by electromagnetic disturbance pulses from relays, from the generator, etc.).

It differs from the normal bus operation by its time-limited duration, although the latter cannot be inferred until after the end of such a pulse burst. The aim in such a case is to reset the shift registers and counters 17 and 18, respectively, once a specific time $T_F$ has elapsed after the interference has delayed. This is achieved by the retriggerable timers 22 and 27, which in each case generate a time window which is composed of the pulse burst duration and the subsequent operating time $T_F$ of the corresponding timer, cf. signal [11] at the output of the timer 22.

The corresponding reset pulse $T_F$ [12] is generated from this signal, in a manner analogous to the function already described with reference to parts 14 to 16, by means of the gate(s) 24 and the EXCLUSIVE-OR circuit 25, and passes via the line 26 to the second input of the OR circuit 33, with the result that the shift registers and counters 17 and 18, respectively, are necessarily reset via said OR circuit 3 after expiry of the time window $T_F$—that is to say, after expiry of the total duration $T_F$ including the temporary disturbance. An identical function is performed by the retriggerable timer 27, the gates 29 and 30 and the line 31 to the third input of the OR circuit 33, with respect to disturbances on the conductor T, the timer 27 preferably being retriggered with the rising signal edge.

In undisturbed bus operation, this reset pulse $R_F$ which to this extent "follows up" an only temporary disturbance, is unimportant, since the bit stream is not interrupted on the normally initialized and undisturbed bus. In other words, the timers are always retriggered, and to this extent are entirely unable to reach the state of an expired time window.

The small outlay on circuitry allows the device according to the invention to be implemented monolithically in semiconductor bus modules such as, for example, receivers, transmitters, transceivers, bus controllers, etc., since it evidently utilizes only structures which, taken per se, are already available as silicon-compilable standard cells.

Figure 5:
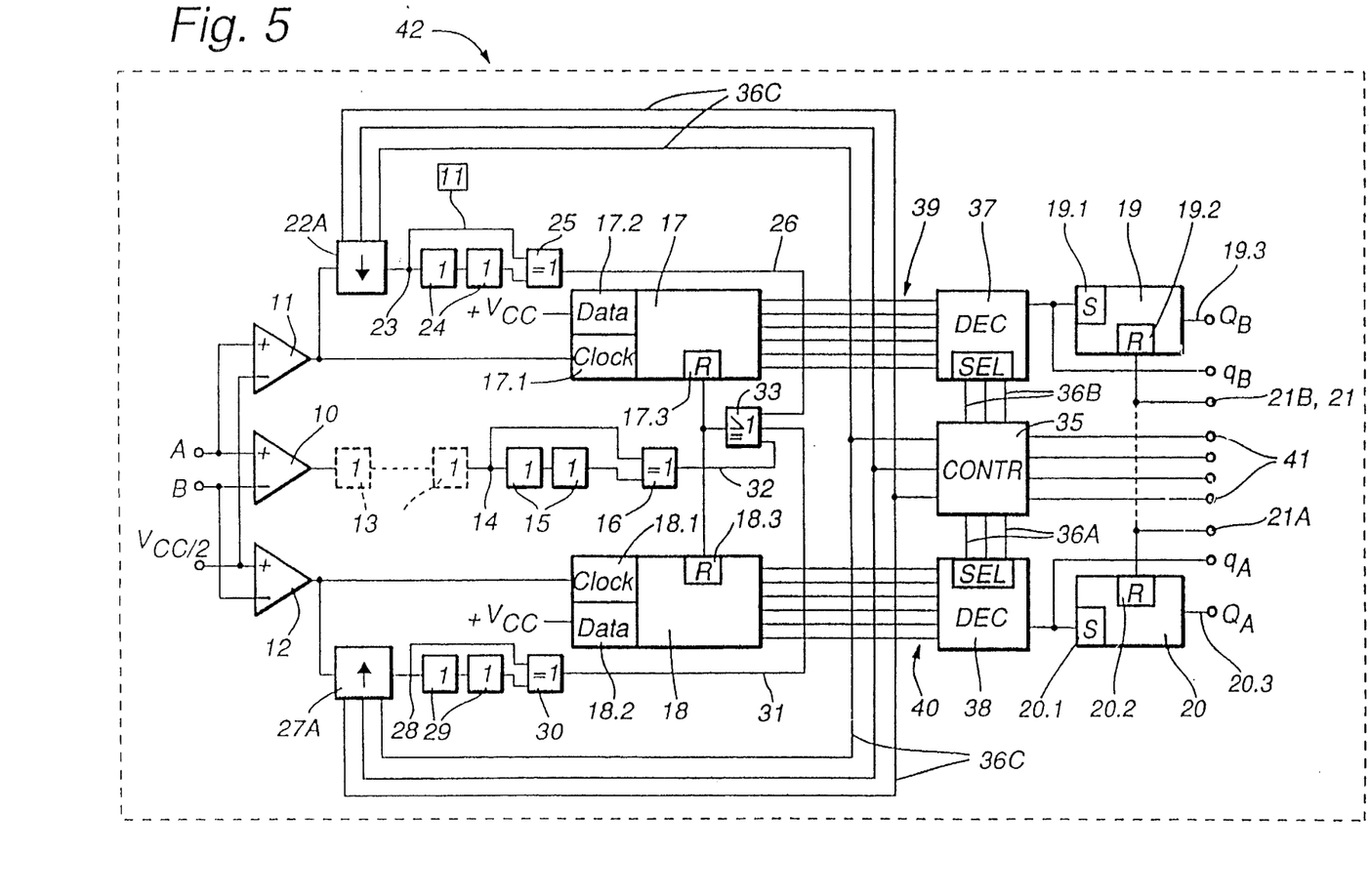
FIG. 5 shows the functional circuit diagram of a third, programmable device which can thereby be applied in a particularly universal way.

The entire device together with all elements belonging to it can, in accordance with FIG. 5, be defined, designed and implemented as a silicon-compilable standard cell 42, and be incorporated as such in the topology of a bus-oriented semiconductor circuit produced using any technology.

Such a standard cell 42 can be designed in a particularly universal way by providing that the shift registers have at least one tap after at least a specific number of shift cells. If counters are used, these counters are made to have a plurality of binary outputs. In another embodiment that provides universality, the standard cell further comprises logic means which, as a function of a logic setting or selection signal which can be fed to these means, permit the effective length of the shift register or the counter states which are to be recognized to be selected or switched over, that is to say to this extent permit the bit depth of the error tolerance of the device to be matched to the particular application of a test step.

The universality of such a standard cell can be further enhanced by providing additional means which, as a function of a logic setting or selection signal which can be fed to one of these means, permit, for example, the retriggerable timers 22A, 27A to be rendered adjustable. Resetting from a completely specified disturbance state can thus be rendered testable.

In accordance with FIG. 5, the last mentioned developments can be implemented, preferably in a combined fashion, within the framework of a standard cell structure 42. As an example, provision is then made, as retriggerable timers, of edge-triggered monostable timers 22A and 27A whose operating time $T_F$ can be digitally programmed as a timeout for the reset pulse $R_F$ in accordance with FIG. 4.

Furthermore, in this case there are connected downstream of the shift registers and counters 17 and 18, respectively, multiplexers or decoders 37 and 38, whose inputs are respectively connected to a plurality of shift register or counter chain taps 39 and 40, respectively. In accordance with the driving of the selection inputs SEL, the multiplexers or decoders 37 and 38 connect a specific shift register or counter chain tap or a truth signal to their output $Q_A$ or $Q_B$ respectively, when a counter state is reached which is currently preselected by the program drive. Thus, within the scope of this example, the error tolerance depth can also be incremented or decremented bit by bit.

A logic setting signal can be applied directly, via a latch arrangement or via special control logic 35 to the setting or preselection path 36C, only three bits wide here, for example, for setting the retriggerable time-out pulse generators and their timers 32A and 37A, respectively, as well as 36A and 36B, for setting the output multiplexers and decoders 38 and 37, respectively.

In this case, such a latch arrangement or control logic 35 can be designed for receiving a parallel or serial setting word via an input path 41, so that in a serial/parallel design, the control logic 35 can itself also contain a shift register as a serial/parallel converter. For a specific application, the input path 41 can also be hard wired to a corresponding setting signal. Such a parallel setting signal can be, for example, generated on-chip or, through being hard wired to earth potential and supply potential, either to be generated on-chip or to be fed from outside via the external IC terminals (mask/wired programming).

For test purposes, the setting signal can, for example, be varied by a computer which is co-integrated on the same chip. It is possible thereby, for the purpose of a test function, to vary both the bit error tolerance depth on the bus line and the delayed resetting of the device after disturbances have occurred on the bus.

For example, it is possible to evaluate the shift register or counter stage numbers or counter states, which are to be selected or set for the (initial) recognition of a bus error, as a measure of the error duration (in bus clock units). Using the decoders 37 and 38, which can be preset in/decrementally in accordance with a test program, it is also possible to implement response filter functions by means of which, for example, fluctuations in the "bit duration" of bus disturbances can be detected and analyzed.

Furthermore, the suggested separate resettability of the flipflops 19 and 20 via separate command inputs 21B and 21A proves to be advantageous with respect to such bus test purposes, for example in connection with setting up comparative bus error statistics for the two bus conductors within the framework of a bus management and service program.

Specifically, in this connection it can be desirable for the bit error tolerance depths for the two conductors to be made unequal or selectable independently of one another, matched to test messages to be sent over the bus, and to clear the static bus error status signals [7], [9] at the outputs $Q_B$ and $Q_A$ independently of one another or to evaluate them together with the volatile dynamic bus error status signals [6], [8] at the outputs $Q_B$ and $Q_A$. For example, sign-dependent errors in output stages can be detected in this way.

Due to the transferability of test results relating to the bus to be tested, such a universal standard cell to this extent permits the implementation of a decentralized bus test system, which is resolved to form a system and which can be used not only to determine the disturbed bus conductors but, in addition, also to locate the cause of a bus disturbance.

The programmable standard cell with standardized characteristics can to this extent interact particularly advantageously, in such an environment, with bus management software written for decentral test routines, by, in addition to fulfilling in such an environment the simple, static testing of a two-wire bus for correct operability of both bus conductors, also fulfilling the function of a sampler or classifier for bus disturbances which "can be filtered", specifically can be masked for bit length, and can to this extent provide information on the time response of a specifically disturbed bus.

Figure 6:
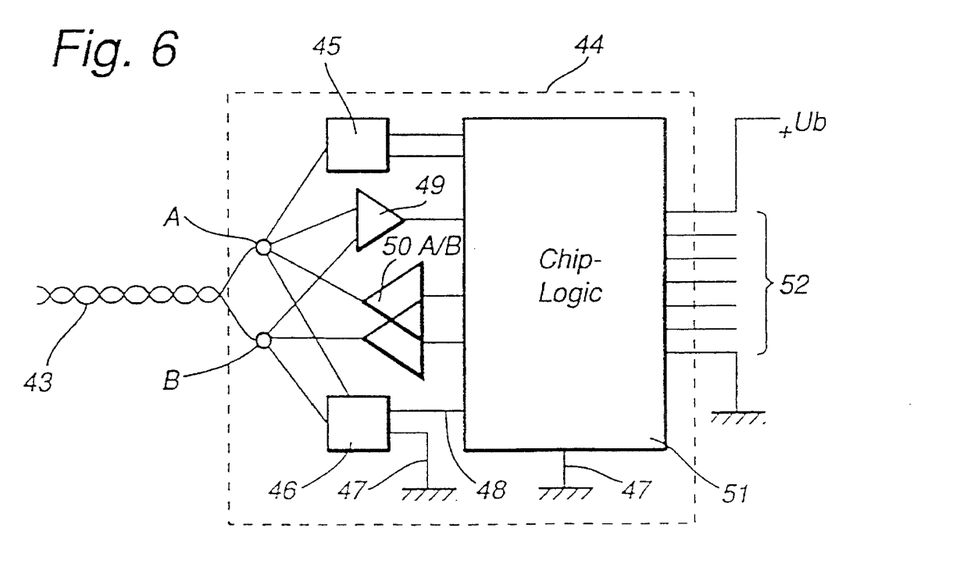
FIG. 6 shows the block diagram of the components providing the bus termination in the case of the use of a device as, for example, a monolithically implementable component of a bus chip.

FIG. 6 illustrates the termination conditions of a two-wire bus 43 at the interface to a bus station, that is to say, for example, with respect to the bus terminals A, B of a bus chip 44.

In this case, the device according to the invention is denoted by 45. With respect to the terminals A and B, the bus receiver 49 and the output stage 50A/B, which operates in a balanced, antiphase manner as well as a network 46, are connected in parallel, which network 46 can be connected to the chip earth 47 and, via the remaining chip logic 51, to the supply voltage $+U_b$. These parts are connected via appropriate connections to the actual bus logic 51 which, for its part, is connected via terminals 52 to the vehicle chassis, a supply potential $U_b$ and the relevant application.

This parallel circuit is tuned as a whole in such a way that, on the one hand, the logic conductor levels can assume mutually distinguishable recessive and dominant states and, on the other hand, undefined floating of the relevant conductor terminal is impossible in the case of interruption of one of the two conductors.

In this case, the network 46 can also be implemented in a fashion distributed in at least one of the parts 49 and 50 A/B and such that, overall, 3.25 and 1.75 volts, respectively, are reached, for example, as the logic limiting level in a recessive bus state for the two bus conductors, but by contrast, 4.0 or 1.0 volts, respectively, are reached, for example, in a dominant bus state.

Clearly, such a termination configuration comprising the device 45 according to the invention can be very advantageously integrated with the relevant chip logic 51, the more so as it is thus possible to achieve defined termination conditions in a simple and cost-effective way at error-free bus stations as an essential precondition for a distributed bus test system.

What is claimed is:

1. Device for monitoring balanced two-wire bus lines and two-wire bus interfaces for serial data transmission, the bus lines and the bus interfaces having first and second line conductors that change their polarity in antiphase in the normal state, the device comprising:

first, second and third comparison means, the first comparison means having a positive input operationally connected to the first bus conductor and a negative input connected to a reference potential (VcC/2); the second comparison means having a negative input connected to the second bus conductor and a positive input connected to said reference potential (VcC/2); and the third comparison means having an input side connected to the first and second bus conductors;

a first shift register or counter having a clock input operationally connected to an output of the first comparison means;

a second shift register or counter having a clock input operationally connected to an output of the second comparison means;

means for processing signal edges to form pulses, the means for processing being connected downstream of the third comparison means and having an output connected to reset inputs of the shift registers or counters;

wherein the shift registers or counters each have at least one output, and wherein a first error status signal responsive to an error in the first bus conductor is generated at an output of said second shift register or counter, and a second error status signal responsive to an error in the second bus conductor is generated at an output of said first shift register or counter.

2. Device according to claim 1, wherein the means for processing signal edges include at least one signal-delaying element and a first EXCLUSIVE-OR circuit having first and second inputs, the first EXCLUSIVE-OR input connected to and driven by the output of the third comparison means, the second EXCLUSIVE-OR input connected to the signal-delaying element and driven by the first EXCLUSIVE-OR input indirectly via the signal-delaying element.

3. Device according to claim 1, further comprising first and second storage means having set inputs and reset inputs, the set inputs respectively connected to the outputs of the first and second shift registers or counters, wherein the reset inputs of the first and second storage means are coupled to receive an external reset signal.

4. Device according to claim 1, further comprising:

first and a second retriggerable pulse generators, respectively coupled to and driven by the outputs of the first and second comparison means, each pulse generator generating a pulse after expiry of at least one prescribed delay time which can be reset by retriggering the respective pulse generator;

an OR function element having at least three inputs and connected downstream of the means for processing signal edges, and wherein each of the first and second pulse generators is connected at its output to a corresponding one of the further inputs of the OR function element.

5. Device according to claim 4, wherein the first retriggerable pulse generator includes a first monostable, retriggerable timer having an output, a first signal-delaying element, a second EXCLUSIVE-OR function element having first and second inputs, the timer output being directly connected to the first input and indirectly connected to the second input via the first signal-delaying element;

a second retriggerable pulse generator includes a second monostable, retriggerable timer having an output, a second signal-delaying element, a third EXCLUSIVE-OR function element having first and second inputs, the timer output being directly connected to the first input and indirectly connected to the second input of the third EXCLUSIVE-OR function element via the second signal-delaying element.

6. Device according to claim 5, wherein each of the signal delaying elements includes at least one of an amplifier structure and a gate structure and a series connection of at least two such structures.

7. Device according to claim 4, further comprising further logic means which, as a function of a logic setting signal which can be fed to these logic means, permit the delay time generated by the pulse generators to be influenced.

8. Device according to claim 1, wherein the shift registers have at least one tap after at least a specific number of cells, or the counters have a plurality of outputs of different value, and wherein the device further comprises further logic means which, as a function of a logic setting signal which can be fed to these logic means, permit an effective length of the shift registers or the effective number of stages of the counters, or the counter state required to generate an error status signal to be switched, and thereby permit an error tolerance depth to be matched to a particular application or disturbance situation.

9. Device according to claim 8, wherein the device is operated in cooperation with software routines of a bus test system as a test receiver for analyzing bus disturbances.

10. Device according to claim 1, wherein the elements of the device are designed as one piece using monolithic circuit technology.

11. Device according to claim 10, wherein the device is integrated together with at least one monolithically implemented bus function (receiver, transmitter, transceiver, etc.) on one and the same semiconductor chip.

12. Device according to claim 11, wherein the device is implemented with all the elements associated with it as a structurally defined, silicon-compilable standard cell, and as such is integrated into the topology of a bus-oriented semiconductor circuit produced using any technology.

* * * * *